UNITED STATES PATENT OFFICE.

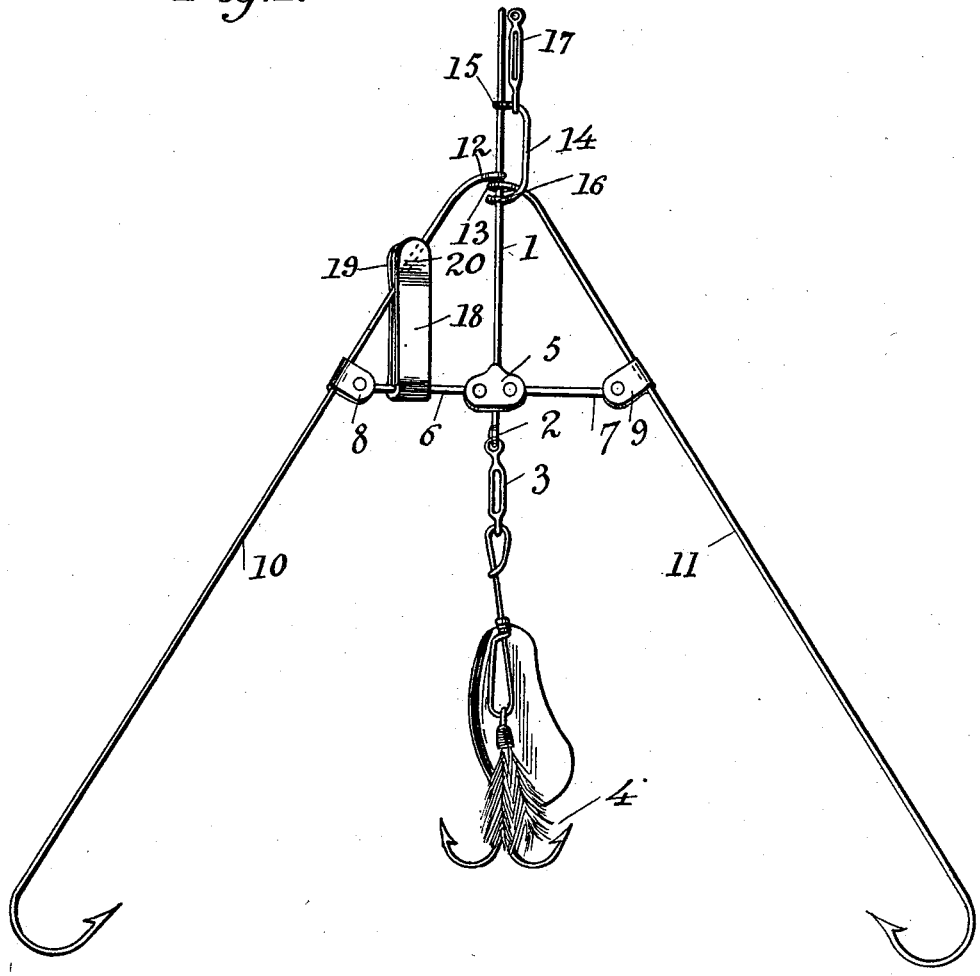

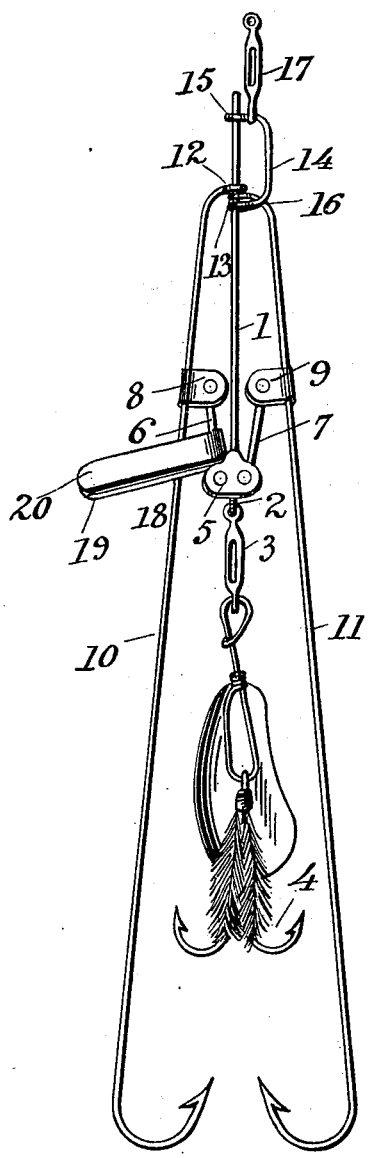

ROBERT SCHINDLER, OF INDEPENDENCE, COLORADO.

AUTOMATIC FISH-HOOK.

SPECIFICATION forming part of Letters Patent No. 594,906, dated December 7, 1897.

Application filed July 15, 1897. Serial No. 644,707. (No model.)

*To all whom it may concern:*

Be it known that I, ROBERT SCHINDLER, a citizen of the United States, residing at Independence, in the county of El Paso and State of Colorado, have invented certain new and useful Improvements in Automatic Fish-Hooks; and I do declare the following to be a full, clear, and exact description of the invention, such as will enable others skilled in the art to which it appertains to make and use the same.

My invention relates to a novel form of fish-hook; and the object is to provide a simple and effective device of this kind whereby the fish will automatically operate the same to insure its capture.

To this end the invention consists in the construction, combination, and arrangement of the same, as will be hereinafter more fully described, and particularly pointed out in the claim.

In the accompanying drawings the same reference-characters indicate the same parts of the invention.

Figure 1 is a plan view of my improved fish-hook as it appears set ready for use. Fig. 2 is a similar view showing the device sprung or closed.

1 represents a guide-rod the lower end of which terminates in an eye 2, to which is attached the swivel 3, and attached to the opposite end of the swivel is the usual trolling spoon gang-hook 4.

5 represents a cross-head fixed to the rod 1 immediately above its eye 2, and 6 and 7 represent connecting-rods pivotally connected to the opposite ends of said cross-head and connecting it with the lugs 8 9, fixed on the lateral arms 10 11, the inner ends of which terminate in integral eyes 12 13, which encompass the rod 1 above the cross-head 5.

A bail 14 terminates in eyes 15 16, which encompass the rod 1 above and below the eyes 12 13 of the arms 10 11, and 17 represents a swivel attached to the bail 14, which in turn is secured to the end of the fishing-line. (Not shown.)

A spring-clip 18 is pivoted at its lower end to the connecting-rod 6, and its spring-jaws 19 20 are adapted to engage that portion of the lateral arm 10 between its ear 8 and eye 12 to hold the arms extended when the device is set, as shown in Fig. 1.

When the fish strikes the trolling-hooks, the strain on the rod 1 releases the clip from the arm 10, and the rods 6 and 7 draw the lateral arms 10 11 inwardly and parallel with the rod 1, so that the outer ends of the lateral arms 10 11 are set into the sides of the fish to prevent the possibility of escape.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

The rod 1 terminating in the eye 2, the trolling gang-hook 4, connected thereto, and the cross-head 5 fixed to said rod, in combination with the lateral arms 10 11 formed with eyes 12 and 13, which encompass said rod and are provided with the ears 8 9, the rods 6 and 7 connecting said arms and cross-head, the bail 14 encompassing the rod 1, above and below the contiguous ends of the arms, and the spring-clip 18, adapted to detachably connect the rod 6 and the lateral arm 10 substantially as shown and described.

In testimony whereof I hereunto affix my signature in presence of two witnesses.

ROBERT SCHINDLER.

Witnesses:
JAMES E. ELMORE,
HENRY FEMKER.